(12) United States Patent
D'Amato et al.

(10) Patent No.: US 7,551,750 B2
(45) Date of Patent: Jun. 23, 2009

(54) HOLOGRAPHIC DIGITAL WATERMARK

(75) Inventors: Sal D'Amato, Monmoth Beach, NJ (US); Brian Mentz, Holmden, CT (US); George Karcich, Park Ridge, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 953 days.

(21) Appl. No.: 10/339,482

(22) Filed: Jan. 9, 2003

(65) Prior Publication Data

US 2003/0223616 A1  Dec. 4, 2003

Related U.S. Application Data

(60) Provisional application No. 60/346,968, filed on Jan. 9, 2002.

(51) Int. Cl.
*G06K 9/00* (2006.01)

(52) U.S. Cl. .......................... 382/100; 216/23; 216/22; 283/82; 283/83; 283/72; 283/94; 283/96; 235/487; 235/457; 235/489; 382/232; 382/210; 359/2; 359/1; 380/232; 380/258

(58) Field of Classification Search ................ 382/100, 382/232, 210; 359/1, 9, 2, 3; 283/96, 72; 380/232, 256
See application file for complete search history.

(56) References Cited

U.S. PATENT DOCUMENTS

| | | | | |
|---|---|---|---|---|
| 5,200,253 A | * | 4/1993 | Yamaguchi et al. | 428/195.1 |
| 5,850,481 A | | 12/1998 | Rhoads | |
| 5,856,048 A | * | 1/1999 | Tahara et al. | 430/1 |
| 6,072,888 A | | 6/2000 | Powell et al. | |
| 6,082,778 A | * | 7/2000 | Solmsdorf | 283/82 |
| 6,109,801 A | * | 8/2000 | Mabit | 400/242 |

(Continued)

OTHER PUBLICATIONS

V. Cappellini et al., Information theoretic aspects in digital watermarking, Signal Processing, 81 (2001) 1117-1119.

(Continued)

*Primary Examiner*—Jingge Wu
*Assistant Examiner*—Nancy Bitar
(74) *Attorney, Agent, or Firm*—Allen, Dyer, Doppelt, Milbrath & Gilchrist, P.A. Attorneys at Law

(57) ABSTRACT

A digital watermark which is incorporated, perceptibly or imperceptibly, into a diffractive device such as a hologram. When applied to protect and/or authenticate a document of value or a product, the device provides an increased degree of overt and covert security, and permits tracking of the sale, use or other parameters associated with the product and/or document of value.

10 Claims, 4 Drawing Sheets

U.S. PATENT DOCUMENTS

2003/0178487 A1*  9/2003  Rogers ........................ 235/454
2005/0116464 A1*  6/2005  Isherwood et al. ............ 283/72
2005/0230958 A1*  10/2005  Payne et al. ................... 283/72

OTHER PUBLICATIONS

H. Berghel, "Digital Watermarking," http://www.acm.org/~hlb/publications/dw_n/dw_n.html, Aug. 27, 2001.

"Captions—adding text or images," http://www.xat.com/io/. Aug. 24, 2001.

F. Mintzer, et al., "Safeguarding Digital Library Contents and Users," D-Lib Magazine, Dec. 1997.

* cited by examiner

HOLOGRAPHIC DIGITAL WATERMARK

RELATED APPLICATION

This application claims priority from U.S. Provisional Application Ser. No. 60/346,968 filed Jan. 9, 2002, which is incorporated by reference in its entirety.

FIELD OF THE INVENTION

The present invention relates to improved security/authentication devices useful in connection with electronic transaction cards, bank notes and other documents of value, products and/or product packaging, and other items subject to counterfeiting and/or requiring authentication. The devices of the invention synergistically combine the security and authentication features of a holographic device with the security and authentication features of a digital watermark. In the invention, a digital watermark is seamlessly and imperceptibly incorporated into and/or combined with a holographic image, or is created by partially demetallizing a metallized substrate or partially metallizing a non-metallic substrate. In addition to providing unequalled security and authentication features, the holographic digital watermark of the invention also enables the collection, communication and tracking of customer, user, product, distribution, trade channel and other commercially-relevant or security-relevant information when used in conjunction with a digital detector and a computer—preferably web-based—tracking program.

BACKGROUND

Counterfeiting of bank notes, and other valuable documents, including but not limited to bonds, drivers' licenses, birth certificates and gift certificates, is a well-known problem. Counterfeiters have become more and more sophisticated in their methods as a result of technological advances. Issuers of bank notes and other valuable documents must therefore continually enhance the security of such documents as technology permits. A significant problem also exists with respect to counterfeit credit cards and other electronic transaction cards.

Similarly, many industries are plagued with the problem of counterfeited or simulated goods. Counterfeited goods are common in the music, movie, art, apparel, ticketing and other industries. As an example, "bootleg" compact discs, videos and DVD's are quite common, as are "knock off" designer hand bags, watches and clothing. Counterfeit tickets are routinely sold to unsuspecting members of the public hoping to attend sporting events, theater and concerts.

Increased sophistication of counterfeiters in recent years has lead to increasingly accurate reproductions of original products and documents. The wide-spread availability of digital imaging technology, sophisticated color reproduction equipment, particularly in connection with the internet, has made it increasingly easy for counterfeiters to reproduce protected works (for instance, realistic looking box art on a DVD) which the ordinary consumer typically cannot detect as counterfeit.

In response to this threat, manufacturers and publishers have attempted to devise ever more sophisticated anti-counterfeiting measures. Hologram security and authentication devices have had much success countering counterfeiters in recent years. A manufacturer wishing to authenticate a product with a hologram (defined herein as including holograms and other similar diffractive devices such as kinegrams, diffraction gratings, excelgrams and other optically variable devices) would permanently affix a hologram to the product. Alternatively, the hologram could be affixed to packaging containing the product to authenticate the material within. Similarly, a hologram could be permanently affixed to the face of a bank note, driver's license, theater ticket or other document of value. Typically the hologram is not removable without damaging it or the surface to which it is affixed. The counterfeiter would thus have to reproduce a hologram to obtain a convincing counterfeit article. Use of sophisticated holograms makes the production of convincing counterfeits even more difficult.

Unfortunately, some sophisticated counterfeiters now have the means to approximate many holograms. In the future it is likely that counterfeiters will gain access to ever more sophisticated technologies, and therefore become increasingly able to counterfeit even more sophisticated holograms.

Digital watermarks have been in existence since approximately 1995, and have been used commercially in recent years. Digital watermarks are security devices which embed ownership, authorship, origin, distribution, customer, purchase or any other type of commercially-relevant or security-relevant information onto or within an image or object.

Previously, digital watermarking has been employed as a technique to protect against unauthorized copying and distribution of digital content. In general, "digital watermarking" comprises an act of embedding information (referred to as a "watermark") into the data set in an unobtrusive way so that the quality of the data set is not reduced, but the watermark can be extracted as the data set is being used. This is typically accomplished by placing the watermark into a noise band of the data set. In the context of a visual image such as a electronic photograph file, the "noise band" may include, for example, a few least significant bits associated with the color of each pixel of an image.

In addition, a watermark may be embedded so as to be resilient to various manipulations of the data set such as, for example, photocopying, scanning, resizing, cropping and color manipulation. Of course, the selected degree of resiliency is determined by the amount of information that can be embedded in a data set. As an illustrative example, if resiliency to cropping is desired, a watermark is placed in a redundant fashion in different portions of the data set. If such cropping resiliency is not desired, bandwidth consumed by such redundancy may be allocated to improve quality of the data set.

Digital watermarks may exist either in perceptible or imperceptible form, depending on the purpose they are meant to serve. Use of the term "imperceptible" refers to digital watermarks which cannot be detected by the untrained naked eye. Imperceptible digital watermarks must nevertheless be detectable by some other means, e.g., be machine readable, to be of value.

Perceptible and imperceptible digital watermark can act as a deterrent to theft and counterfeiting in different ways. Perceptible watermarks alert the viewer that the document or image is protected, and diminish its commercial value. Imperceptible watermarks increase the likelihood of successful prosecution and may also act as a deterrent if the criminal is sufficiently computer literate. The table below shows some of the known primary (P) and secondary (S) benefits of digital watermarking:

| Purpose | Perceptible | Imperceptible |
| --- | --- | --- |
| Determine ownership | P | P |
| Validation of intended recipient | — | P |
| non-repudiable transmission | — | P |
| Deterrence against theft | P | P |
| meta level, content labeling | — | P |
| Diminish commercial value without diminished utility | P | — |
| Discourage unauthorized duplication | P | P |
| Authentication | S | P |
| Identify document source | P | P |
| Network patrolling (e.g., on Web) | S | P |
| rights management (e.g., "copies remaining") | S | P |

As noted above, until now, the use of digital watermark technology was employed most often for the protection of digital images existing in electronic form. Many of the uses listed above, for instance, apply only to electronic images. To the extent that digital watermarking technology has been applied to physical objects such as printed art work, this has always been accomplished with an ink-based digital watermark. Ink-based digital watermarks, although useful in certain applications, ultimately do not provide the highest available level of anti-counterfeit protection. This is because printed digital watermarks are susceptible to counterfeiting without the use of holographic technologies.

The invention also relates to a tracking system. Product tracking systems are also known. For instance, the ubiquitous bar code label on many products permits the compilation of a limited amount of product and customer information.

In several ways, however, bar coding is quite limited. Initially, bar coding is visible to the naked eye. There is nothing about the bar code which is imperceptible or "covert". Thus the ability of a bar code to provide the security features discussed above is limited. A bar code also cannot be incorporated into a hologram without comprising the optical and aesthetic integrity of the hologram. Further, a bar code cannot encode the same amount of information as a digital watermark. Thus, unlike a bar code, a digital watermark can be tailored to individual products (e.g., each watermarks might encode a different product serial number).

SUMMARY OF THE INVENTION

The present invention combines the use of holography, digital watermark technology, demetallizing and/or metallizing technology and computer or web-based tracking technology.

For the first time, a digital watermark has been embedded within a hologram, resulting on a security device, which carries both overt and covert security features. The overt feature of the device is a holographic image readable with the naked eye. The covert feature of the device is the digital watermark, which is embedded in holographic form into the hologram, the background of the hologram, or both. Incorporation of a digital watermark into the hologram permits a purely holographic device to convey covert data, increases the level of sophistication required of a counterfeiter since a counterfeiter is now faced with the problem of reproducing a much more sophisticated and complex hologram, and all but eliminates the potential reproducibility problems associated with of ink-based digital watermarks.

The holographic digital watermark is machine readable by a digital camera or a scanner in connection with a computer running image recognition software. The computer collects the information contained on the digital watermark, and thus is able to track the product or document to which the holographic watermark is affixed.

Also for the first time, a digital watermark has been created by demetallization and/or metallization (with or without a hologram). The covert or overt feature of a holographic digital watermark may also be incorporated into a watermark created via metallization/demetallization.

It is an object of the present invention to use a holographic and/or demetallized digital watermark as an anti-counterfeit and authentication device on transaction cards, bank notes and documents of value, security packaging and products requiring authentication.

It is an object of the present invention to use a holographic and/or demetallized digital watermark to convey covert data imperceptible to the human eye but readable by a digital camera, scanner or similar device in conjunction with a computer.

It is also object of the present invention to use a holographic and/or demetallized digital watermark to provide a low cost, flexible, effective system for in-field inspection of products and/or documents.

It is a further object of the present invention to use holographic and/or demetallized digital watermarks to track commercial and security information.

Various other objects of the present inventions will become readily apparent from the ensuing detailed description and drawings.

BRIEF DESCRIPTION OF THE DRAWINGS

The below detailed description is given by way of example and is not intended to limit the present invention solely to the embodiments described therein. The description is best be understood in conjunction with the accompanying drawings.

DETAILED DESCRIPTION OF THE INVENTION

Figure 1:
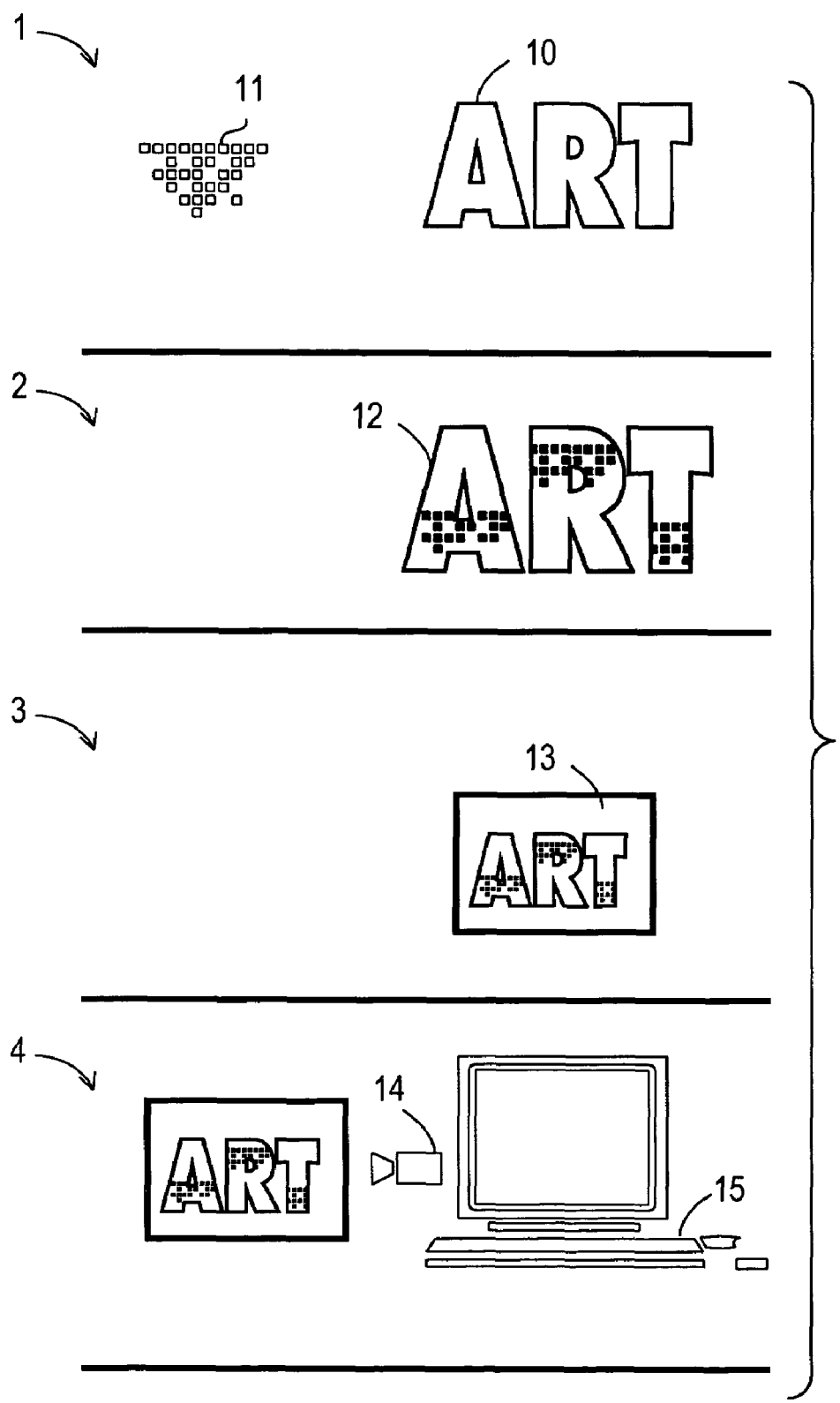
FIG. 1 is a flow chart describing the process of integrating a digital watermark into a hologram, and then detecting and tracking said digital watermark.

FIG. 1 describes the steps involved in producing, and the components comprising, the holographic digital watermark of the invention. In the first step 1, a digital image 10 depicted here as "ART", is generated by known techniques such as digital photography, scanning, digital image generation and digital image manipulation.

Concurrently, a digital watermark pattern 11 is generated. A number of methods may be employed in incorporating a digital watermark pattern onto a hologram. As with other holographic images, a digital watermark may comprise a textured image embossed or otherwise imported ("embossed") onto a holographic layer, which itself is on a substrate. The watermark pattern may also be embossed directly onto a substrate. In either instance, when the substrate and/or the holographic layer is substantively transparent, a metallized layer is added, for instance by vapor deposition, to the substrate or holographic layer to facilitate the viewing of the hologram. The digital watermark pattern may also be embossed onto a metallized surface of a substrate or onto a metallic substrate. The invention relates to digital watermarks found by each of these techniques and as well as any other technique now employed to create holographic images.

Digital watermarks created by the demetallization of a metallized substrate may also be used in connection with holographic images, or independently in the absence of a holographic image. In such an embodiment, rather than being incorporated into the textured surface of the holographic image itself, the digital watermark pattern is created by demetallizing portions of a metallized surface. The demetallized gaps form a digital watermark. The remaining metallized portions, after demetallization has occurred, may also form a digital watermark.

Figure 7:
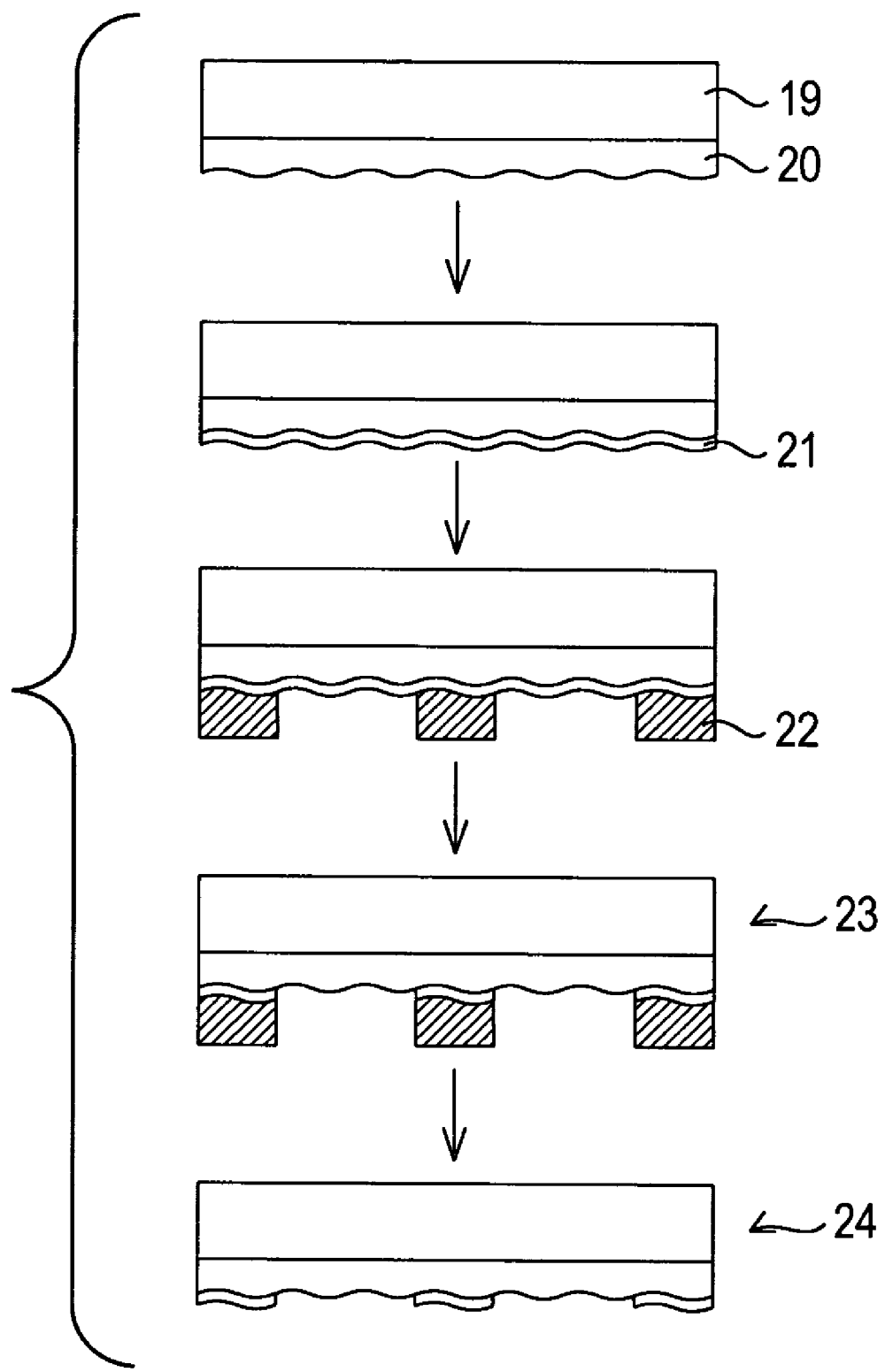
FIG. 7 depicts the demetallization process.

In the case of a demetallized watermark, the watermark may be created as shown in FIG. 7. A substrate (19) is provided with a holographic layer (20) which has been embossed with a holographic image. A metallic layer (21) is deposited on the holographic layer. A "resist" coating (22) is then selectively applied on the metallic layer. Where demetallized gaps are to form the watermark, the pattern of resist applied is to be a "negative" image of the desired pattern of the demetallization. In other words, resist is printed where demetallization is not desired. As noted in greater detail below, variability of watermarks can be introduced by varying the resist pattern among multiple substrates. For instance, the resist coating can be applied by an ink jet controlled by a computer which varies the ink jet's printing from one substrate to the next. By subjecting the coated substrate to an acid or caustic wash, those portions of the metallic coating not protected by the resist are removed, resulting in regions of substrate with and without metallization (23). The resist coating is removed by known methods, having the metallized regions exposed (24).

Another technique for creating a demetallized digital watermark patter entails applying a coating to a surface, such as a holographic surface, before metallizing the surface. The coating is applied in a pattern such that the coated portions will resist subsequent metallization, and only uncoated regions will be metallized. In this technique, the metallization-resistant coating is applied in a "positive" image of the desired demetallized watermark.

Figure 3:
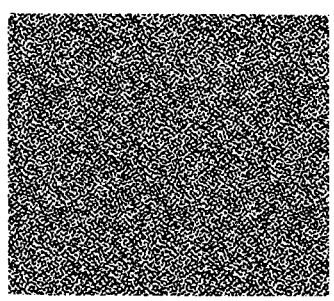
FIG. 3 shows a watermark pattern.

A digital watermark can have any number of appearances to the unaided eye, but often appears as in FIG. 3 as a detailed series of highlighted and non-highlighted regions. The highlighted and non-highlighted regions may consist of any contrast, such as with paper and ink, embossments or metallized/demetallized regions. Information contained in the digital watermark cannot be discerned without the aid of an appropriately programmed and initialized reading device.

Referring again to FIG. 1, in a second step 2, the digital image 10 is transformed into a holographic or other image by known techniques. Contemporaneously, the digital watermark 11 is also incorporated into or combined with the holographic image, either via embossing or demetallization. The result is a holographic watermarked image 12. Importantly, the digital watermark incorporated into one image may vary with subsequent images. For instance, a computer program might generate a first watermark to be incorporated onto a first image, and a second different watermark to be incorporated onto a second image, and so on indefinitely. In this matter, individual images (or workpieces) are covertly or overtly labeled.

Figure 5:
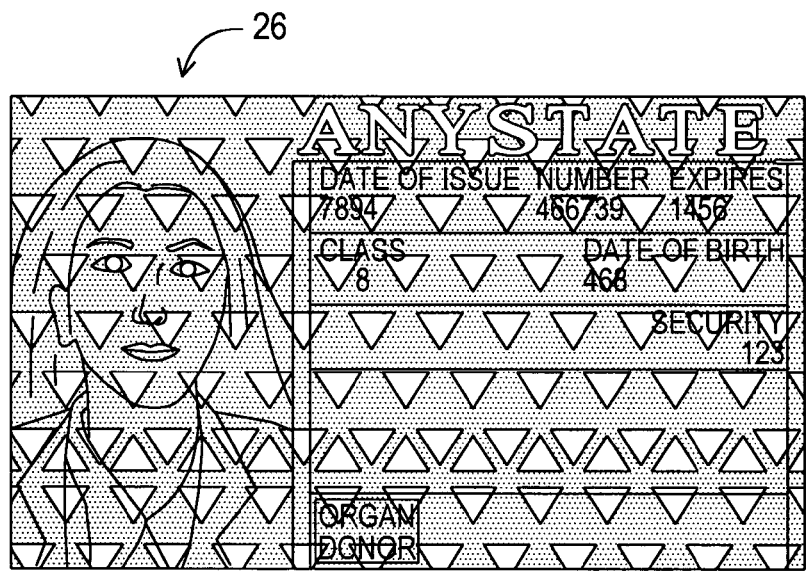
FIG. 5 depicts a holographic image (triangle pattern) incorporated with a demetallized watermark pattern. The holographic image with incorporated demetallized watermark patterns are positioned over an identity card.
Figure 6:
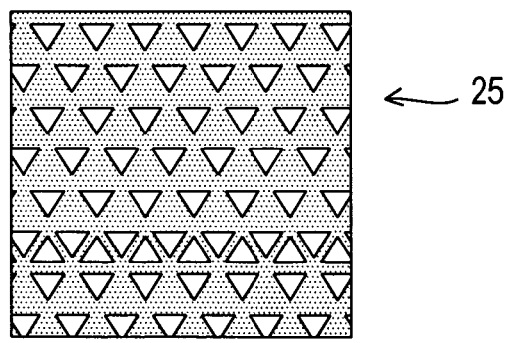
FIG. 6 depicts a holographic image (triangle pattern) incorporated with a demetallized watermark pattern.

The watermarked image 12 is then placed on a product (or packaging, or a document of value such as a banknote, etc.) 13 in a third step 3. As shown in FIG. 6, a holographic pattern (triangles) and a demetallized watermark pattern are incorporated onto an overlay sheet product (25). The overlay can then be used as a security feature on an identity card (26), as is shown in FIG. 5. In this embodiment of the invention, demetallization serves the dual roles of creating a watermark pattern and permitting the viewing of pictorial and alphanumerical information beneath the holographic image and watermark pattern.

In a fourth step 4, the digital watermark 11, possibly imperceptible to the untrained human eye, can be detected by a digital reader 14 such as a scanner or digital camera used in conjunction with a computer running the appropriate detection software 15. Information contained in the digital watermark, and optionally other information including but not limited to information relating to identity of the product purchaser, user, seller and/or distributor, can be collected by the computer. For a given purchase, therefore, the recorded information might include product number, product serial number, and the place and time of manufacture (from the watermark); and date/time of purchase, identity of purchaser, and credit card number of purchaser (collected at the time and place of purchase). The information collected in step 4 can then be transmitted to the product manufacturer, distributor, marketer or other party.

In another embodiment of the invention, the user of a product must scan the digital watermark image 12 with a detector 14 to enable use of the product. Information pertaining to the time, place and other conditions of use could then be collected and transmitted.

Figure 2:
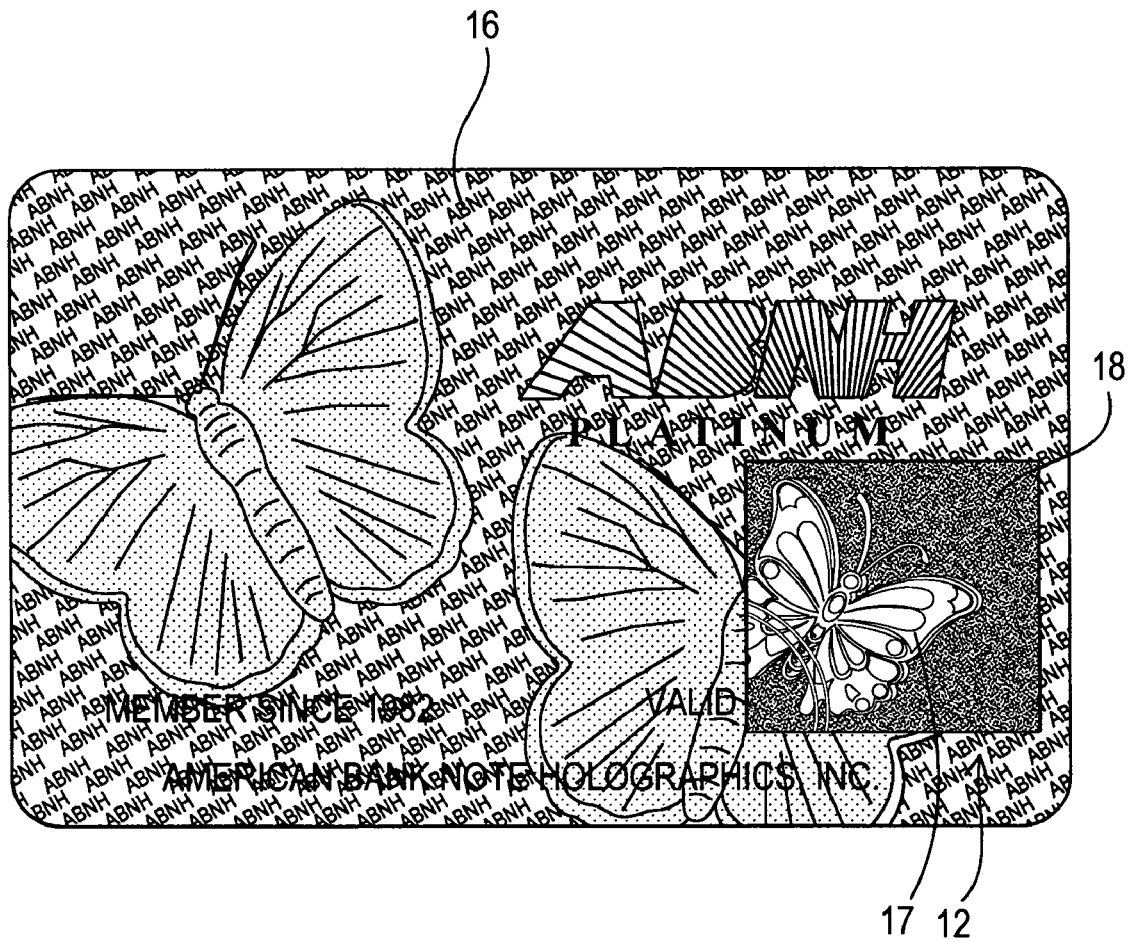
FIG. 2 is an enlarged depiction of an electronic transaction card having affixed to it a holographic digital watermark.
Figure 4:
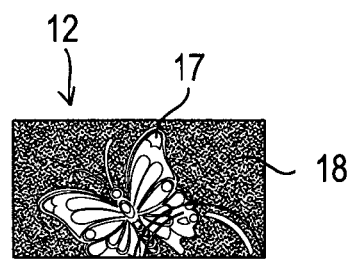
FIG. 4 shows a watermark pattern incorporated with a holographic image.

FIGS. 2 and 4 represent embodiments of the invention employed in connection with an electronic transaction card 16. In these embodiments, the holographic watermark image 12 comprises a traditional holographic image 17 and a background portion 18 that has embedded within it a digital watermark. As can be seen from FIG. 2, the digital watermark is imperceptible and indistinguishable to the naked eye. The digital watermark is itself holographic, meaning that it exists as microscopic ridges embossed upon a substrate. Typically the substrate is a polymer made (machine) readable via the deposition of a reflective material adjacent the embossing, although other constructions are also common.

While the present invention has been particularly described with respect to the illustrated embodiment, it will be appreciated that various alterations, modifications and adaptations may be made on the present disclosure, and are intended to be within the scope of the present invention. It is intended that the appended claims be interpreted as including the embodiment discussed above, those various alternatives, which have been described, and all equivalents thereto.

What is claimed:

1. A holographic digital watermark device comprising:
    a holographic film comprising a plurality of imaged areas and a plurality of non-imaged areas, each image area comprising at least one visually perceptible image; and
    a metal layer on said holographic film which has been selectively demetallized in areas corresponding to said plurality of non-imaged areas to form at least one digital watermark which comprises demetallized gaps formed by applying a resist material on the metal layer in a negative image of a desired demetallized pattern and then removing portions of the metal layer which are not coated with the resist material.

2. The device of claim 1, wherein said at least one visually perceptible image is selected from the group consisting of holograms, kinegrams, diffraction gratings, exegrams and other optically variable devices.

3. The device of claim 1, wherein said device is a security device, an authentication device, or both.

4. An apparatus for reading an embossed digital watermark from a holographic digital watermark device, comprising a detector capable of detecting said digital watermark, and a computer capable of deriving information from said detected watermark; and wherein said holographic digital watermark device comprises:
- a holographic film comprising a plurality of imaged areas and a plurality of non-imaged areas, each image area comprising at least one visually perceptible image; and
- a metal layer on said holographic film which has been selectively demetallized in areas corresponding to said plurality of non-imaged areas to form at least one digital watermark, or which has been coated in areas corresponding to said plurality of imaged areas and selectively metallized in areas corresponding to said plurality of non-imaged areas to form at least one digital watermark.

5. The apparatus of claim 4, wherein said detector is selected from the group consisting of a digital scanner and a digital camera.

6. The apparatus of claim 4, wherein said information relates to one or more of manufacturer identity information, distributor identity information, purchaser identity information, user identity information, product serial number information and product model number information.

7. The device of claim 1, wherein said at least one watermark comprises information relating to one or more of manufacturer identity information, distributor identity information, purchaser identity information, user identity information, product serial number information and product model number information.

8. The device of claim 1, wherein said holographic digital watermark device is a security/authentication label.

9. The device of claim 1, wherein said holographic digital watermark device is an overlay which can be applied to transaction cards to enhance the security of said transaction cards.

10. The device of claim 1, wherein the areas in said metal layer corresponding to said plurality of non-imaged areas are demetallized based on said at least one visually perceptible image and a desired watermark pattern.

* * * * *